(12) United States Patent
Terada et al.

(10) Patent No.: US 9,919,618 B2
(45) Date of Patent: Mar. 20, 2018

(54) MOTOR DRIVE CONTROL DEVICE

(71) Applicant: TOYOTA JIDOSHA KABUSHIKI KAISHA, Toyota-shi, Aichi (JP)

(72) Inventors: Makito Terada, Okazaki (JP); Hideki Fukudome, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/124,147

(22) PCT Filed: Feb. 20, 2015

(86) PCT No.: PCT/JP2015/055495
§ 371 (c)(1),
(2) Date: Sep. 7, 2016

(87) PCT Pub. No.: WO2015/146445
PCT Pub. Date: Oct. 1, 2015

(65) Prior Publication Data
US 2017/0015213 A1   Jan. 19, 2017

(30) Foreign Application Priority Data

Mar. 28, 2014   (JP) .................................. 2014-067538

(51) Int. Cl.
*B60K 6/365* (2007.10)
*B60K 6/26* (2007.10)
(Continued)

(52) U.S. Cl.
CPC ................ *B60L 15/38* (2013.01); *B60K 1/04* (2013.01); *B60K 6/365* (2013.01); *B60K 7/0007* (2013.01); *B60K 17/043* (2013.01); *B60K 17/046* (2013.01); *B60K 17/356* (2013.01); *B60L 3/0023* (2013.01); *B60L 11/18* (2013.01); *B60L 15/20* (2013.01); *B60L 15/2009* (2013.01); *B60L 15/2054* (2013.01); *B60W 10/08* (2013.01);
(Continued)

(58) Field of Classification Search
CPC ......... B60K 6/365; B60K 6/26; F16H 37/086; F16H 15/28
See application file for complete search history.

(56) References Cited

U.S. PATENT DOCUMENTS

| | | | | |
|---|---|---|---|---|
| 2,569,658 A | * | 10/1951 | De Beauregard | F16H 15/28 476/33 |
| 3,684,065 A | * | 8/1972 | Scheiter | F16H 37/086 192/113.34 |
| 2006/0169506 A1 | * | 8/2006 | Handa | B60K 6/26 180/65.51 |

FOREIGN PATENT DOCUMENTS

JP        2009-090923 A        4/2009

* cited by examiner

*Primary Examiner* — Yuri Kan
(74) *Attorney, Agent, or Firm* — Oliff PLC

(57) ABSTRACT

A motor drive control device is capable of reducing gear rattling noise generated in a speed reducer without increasing size of the speed reducer and the number of components. A motor ECU controls a motor to generate a reverse set torque (Tn) when a target torque (T*) is reversed (at a time t1). The motor ECU sequentially calculates a backlash (B) in a counter gear mechanism, and sets a time period (D1) in which the reverse set torque (Tn) is generated by the motor and a time period (D2) in which a return set torque (Tp) is generated by the motor so that the backlash (B) at a current time becomes equal to a time integrated value (corresponding to an area A) of an estimated relative velocity (V2−V1) until a time of re-abutment.

6 Claims, 9 Drawing Sheets

(51) Int. Cl.
*F16H 15/28* (2006.01)
*B60L 15/38* (2006.01)
*B60L 3/00* (2006.01)
*B60L 15/20* (2006.01)
*B60W 10/08* (2006.01)
*B60K 7/00* (2006.01)
*B60K 17/04* (2006.01)
*B60K 17/356* (2006.01)
*B60K 1/04* (2006.01)
*B60L 11/18* (2006.01)
*G05B 15/02* (2006.01)

(52) U.S. Cl.
CPC ...... *G05B 15/02* (2013.01); *B60K 2007/0038* (2013.01); *B60K 2007/0061* (2013.01); *B60L 2240/421* (2013.01); *B60L 2240/423* (2013.01); *B60L 2240/48* (2013.01); *B60L 2260/26* (2013.01); *B60L 2270/14* (2013.01); *B60L 2270/142* (2013.01); *B60W 2710/083* (2013.01); *Y02T 10/645* (2013.01); *Y02T 10/72* (2013.01); *Y02T 10/7275* (2013.01)

MOTOR DRIVE CONTROL DEVICE

TECHNICAL FIELD

The present invention relates to a motor drive control device to be mounted in an in-wheel motor driven automobile.

BACKGROUND ART

There is hitherto known an in-wheel motor driven automobile including motors and speed reducers that are arranged inside of wheels. In the in-wheel motor driven automobile, when a direction of a torque of each of the motors is reversed, there is a fear in that gear rattling noise may be generated due to a backlash in the speed reducer and be audible to a driver. Patent Literature 1 proposes a technology of reducing the gear rattling noise generated due to the backlash in the speed reducer. An in-wheel motor provided with a speed reducer, which is proposed in Patent Literature 1, includes a motor output shaft to be fitted into a rotor, which is divided into two portions. To each of the two portions of the motor output shaft, an output section including a speed reducer is coupled. One of the output sections includes a first helical gear firmly fixed to the output section and a second helical gear to be brought into meshing engagement with the first helical gear. Another output section includes a third helical gear firmly fixed to the another output section, which is provided so as to be helical in a direction opposite to the first helical gear, and a fourth helical gear to be brought into meshing engagement with the third helical gear. In the in-wheel motor, the second helical gear and the fourth helical gear are fitted over the same output shaft (axel) to transmit a torque to a wheel.

The in-wheel motor described above is configured to reduce the backlash so as to reduce the gear rattling noise generated by the helical gears by shifting a position at which the third helical gear and the fourth helical gear come into meshing engagement with each other in a circumferential direction with respect to a position at which the first helical gear and the second helical gear come into meshing engagement with each other.

CITATION LIST

Patent Literature

[PTL 1] JP 2009-90923 A

SUMMARY OF INVENTION

In the in-wheel motor proposed in Patent Literature 1, however, the motor output shaft is divided into the pair of (two) portions, and hence a helical gear mechanism is required to be provided to each of the portions of the motor output shaft. Therefore, the speed reducer is increased in size, while the number of components is increased.

The present invention has been made to solve the problem described above, and therefore has an object to prevent a speed reducer from being increased in size and/or the number of components from being increased so as to reduce gear rattling noise generated in the speed reducer.

In order to achieve the above-mentioned object, one feature of the present invention resides in a motor drive control device (80) to be mounted in an in-wheel motor driven automobile including a motor (30) and a speed reducer (50) installed inside a wheel, the in-wheel motor driven automobile being configured to transmit a torque of the motor to the wheel through an intermediation of the speed reducer, the motor drive control device (80) being configured to control driving of the motor in accordance with a target torque, the motor drive control device including:

relative-position detection means (S13) for detecting a relative position (B) between a tooth (51$t$) of an input-side gear (51) and a tooth (52$t$) of an output-side gear (52) included in the speed reducer; and motor-speed control means (S11 to S19) for reducing a rotation speed of the motor when a direction of the target torque is reversed from a first direction to a second direction and for increasing the rotation speed of the motor at timing determined based on the relative position in a middle of an idling time period in which the input-side gear rotates in the second direction relative to the output-side gear due to a backlash present between the input-side gear and the output-side gear, to thereby lower an approach velocity at which the tooth of the input-side gear approaches the tooth of the output-side gear.

The motor drive control device according to one embodiment of the present invention is mountable in the in-wheel motor driven automobile for transmitting the torque of the motor to the wheel through an intermediation of the speed reducer, and controls the driving of the motor so that the torque of the motor follows the target torque. The target torque is a target value of the motor torque, which is set, for example, in accordance with the amount of operation by a driver and a motion state of a vehicle, and is calculated in predetermined calculation cycles. In the in-wheel motor driven automobile, when the direction of the motor torque is reversed, there is a fear in that gear rattling noise may be generated due to the backlash in the speed reducer and be audible to the driver. Therefore, the motor drive control device according to one embodiment of the present invention includes the relative-position detection means and the motor-speed control means to reduce the gear rattling noise.

The relative-position detection means detects the relative position between the tooth of the input-side gear and the tooth of the output-side gear included in the speed reducer. For example, the relative-position detection means acquires a rotational position of a rotary shaft of the input-side gear and a rotational position of a rotary shaft of the output-side gear and detects the relative position between the tooth of the input-side gear and the tooth of the output-side gear based on the two rotational positions.

The motor-speed control means reduces the rotation speed of the motor when the direction of the target torque is reversed from the first direction to the second direction. Specifically, when the target torque to be generated by the motor is reversed from a driving torque to a braking torque, the braking torque is generated by the motor to lower the rotation speed of the motor.

When the rotation speed of the motor is lowered, the meshing engagement between the input-side gear and the output-side gear is released. The motor-speed control means increases the rotation speed of the motor at the timing determined based on the relative position detected by the relative-position detection means in the middle of the idling time period in which the input-side gear rotates in the second direction relative to the output-side gear due to the backlash present between the input-side gear and the output-side gear, to thereby lower the approach velocity at which the tooth of the input-side gear approaches the tooth of the output-side gear.

Therefore, an abutment velocity (|moving velocity of the tooth of the output-side gear|−(moving velocity of the tooth of the input-side gear|) at which the tooth of the input-side gear comes into abutment against the tooth of the output-side gear can be reduced. In this manner, collision energy at the time of abutment of the tooth of the input-side gear against the tooth of the output-side gear can be reduced. As a result, according to one embodiment of the present invention, the gear rattling noise generated in the speed reducer can be reduced without increasing the speed reducer in size and/or increasing the number of components. The input-side gear is a gear to which the torque is input from the motor, whereas the output-side gear is a gear that transmits the torque to the wheel.

According to one embodiment of the present invention, the motor-speed control means controls the rotation speed of the motor so that the tooth of the input-side gear comes into abutment against the tooth of the output-side gear in a state in which the approach velocity is lowered to a preset set velocity for reducing gear rattling noise.

According to one embodiment of the present invention, the motor-speed control means controls the rotation speed of the motor so that the tooth of the input-side gear comes into abutment against the tooth of the output-side gear in a state in which the approach velocity is lowered to a preset set velocity for reducing gear rattling noise. For example, when the set velocity for reducing gear rattling noise is set to zero, the motor-speed control means controls the rotation speed of the motor so that the tooth of the input-side gear comes into abutment against the tooth of the output-side gear when the moving velocity of the tooth of the input-side gear becomes equal to that of the tooth of the output-side gear. Therefore, according to one embodiment of the present invention, the gear rattling noise generated in the speed reducer can be reduced in an excellent manner. Although the set velocity for reducing gear rattling noise is preferably zero, any velocity may be used as long as the gear rattling noise generated in the speed reducer can be substantially reduced.

One embodiment of the present invention resides in that the motor-speed control means includes:

torque generation time period setting means (S15) for setting, based on the relative position, a first time period (D1) starting at a time at which the direction of the target torque is reversed from the first direction to the second direction, in which a braking torque is generated by the motor, and a second time period (D2) starting at end of the first time period, in which a driving torque in the first direction is generated by the motor; and normal control return means (S20) for returning control to normal control corresponding to a control mode in which the driving of the motor is controlled in accordance with the target torque, at end of the second time period.

According to one embodiment of the present invention, the motor-speed control means includes the torque generation time period setting means and the normal control return means. The torque generation time period setting means sets, based on the relative position detected by the relative-position detection means, the first time period starting at the time at which the direction of the target torque is reversed from the first direction to the second direction, in which the braking torque is generated by the motor, and the second time period starting at the end of the first time period, in which the driving torque in the first direction is generated by the motor. The normal control return means returns the control to the normal control corresponding to the control mode in which the driving of the motor is controlled in accordance with the target torque, at the end of the second time period.

The gear rattling noise in the speed reducer becomes smaller as the abutment velocity at which the tooth of the input-side gear comes into abutment against the tooth of the output-side gear (abutment velocity at which the tooth of the input-side gear rotates in the second direction relative to the tooth of the output-side gear to come into abutment against the tooth of the output-side gear) becomes lower. On the other hand, the abutment velocity changes depending on the first time period (time period in which the braking torque is generated by the motor) and the second time period (time period in which the driving torque in the first direction is generated by the motor). Therefore, according to one embodiment of the present invention, the first time period and the second time period are set based on the relative position between the tooth of the input-side gear and the tooth of the output-side gear during the idling time period. Therefore, the gear rattling noise in the speed reducer can be reduced in an excellent manner.

One embodiment of the present invention resides in that the motor drive control device further includes relative-velocity detection means (S14) for detecting a relative velocity between the tooth of the input-side gear and the tooth of the output-side gear, and the torque generation time period setting means sets the first time period and the second time period based on the relative position detected by the relative-position detection means and the relative velocity detected by the relative-velocity detection means.

In the middle of the idling time period, the rotation speed of the output-side gear sometimes fluctuates due to a disturbance such as an external force input from a road surface to the wheel. In a case where the rotation speed of the output-side gear fluctuates due to the disturbance described above, the timing at which the tooth of the input-side gear comes into abutment against the tooth of the output-side gear varies. Therefore, according to one embodiment of the present invention, the relative-velocity detection means detects the relative velocity between the tooth of the input-side gear and the tooth of the output-side gear, and the torque generation time period setting means sets the first time period and the second time period based on the relative position and the relative velocity. Therefore, even when the rotation speed of the output-side gear fluctuates due to the disturbance, the fluctuation in rotation speed can be reflected to appropriately set the first time period and the second time period. As a result, according to one embodiment of the present invention, the gear rattling noise in the speed reducer can be reduced in an excellent manner.

One embodiment of the present invention resides in that the torque generation time period setting means sets the first time period and the second time period so that a current backlash (B) representing a relative movement amount of the tooth of the input-side gear relative to the tooth of the output-side gear, which is required for the tooth of the input-side gear to come into abutment against the tooth of the output-side gear and is obtained based on the relative position, and an integrated value (A) obtained by integrating a predicted approach velocity at which the tooth of the input-side gear moves to approach the tooth of the output-side gear in a period from a current time to a time at which the tooth of the input-side gear comes into abutment against the tooth of the output-side gear by time become equal to each other.

According to one embodiment of the present invention, the torque generation time period setting means acquires the current backlash representing a relative movement amount of the tooth of the input-side gear to the tooth of the output-side gear, which is required for the tooth of the input-side gear to come into abutment against the tooth of the output-side gear. The current backlash is obtained based on the relative position detected by the relative-position detection means and may be the amount expressed by a distance or the amount expressed by a rotation angle. The torque generation time period setting means sets the first time period and the second time period so that the current backlash and the integrated value obtained by integrating the predicted approach velocity at which the tooth of the input-side gear approaches the tooth of the output-side gear in the period from the current time to the time at which the tooth of the input-side gear comes into abutment against the tooth of the output-side gear by time become equal to each other.

In this manner, at timing at which the current backlash becomes zero, the moving velocity of the tooth of the input-side gear can be made equal to the moving velocity of the tooth of the output-side gear. In other words, at the timing at which the moving velocity of the tooth of the input-side gear becomes equal to the moving velocity of the tooth of the output-side gear, the tooth of the input-side gear can be brought into abutment against the tooth of the output-side gear. Therefore, according to one embodiment of the present invention, the gear rattling noise generated in the speed reducer can be reduced in a further excellent manner.

The current backlash can be obtained from, for example, the relative position between the tooth of the input-side gear and the tooth of the output-side gear, which is detected by the relative-position detection means. Moreover, the predicted approach velocity can be obtained from, for example, the sum of the relative velocity at the current time, which is detected by the relative-velocity detection means, and a predicted relative-velocity change amount after the current time.

One embodiment of the present invention resides in that a braking torque and a driving torque in the first direction, which are to be generated by the motor during the idling time period, are set to have the same magnitude.

In the motor drive control device for controlling the driving of the motor in accordance with the target torque, even when the direction of the target torque is reversed, the torque generated by the motor is required to quickly follow the target torque. In response to the request described above, according to one embodiment of the present invention, the magnitude of the braking torque and the magnitude of the driving torque in the first direction, which are to be generated during the idling time period, are set to the same value. Therefore, a large torque can be generated within the range of capability of the motor in both the first time period in which the relative velocity (approach velocity) of the tooth of the input-side gear to the tooth of the output-side gear and the second time period in which the relative velocity (approach velocity) of the tooth of the input-side gear to the tooth of the output-side gear during the idling time period. Therefore, according to one embodiment of the present invention, the reduction of gear rattling noise generated in the speed reducer and followability of the motor torque can be both achieved.

In the description above, reference symbols used in the embodiment are enclosed in parentheses and assigned to each configuration of the invention corresponding to the embodiment in order to facilitate the understanding of the invention, but each configuration requirement of the invention is not limited to the embodiment prescribed by the reference symbols.

DESCRIPTION OF EMBODIMENT

Figure 1:
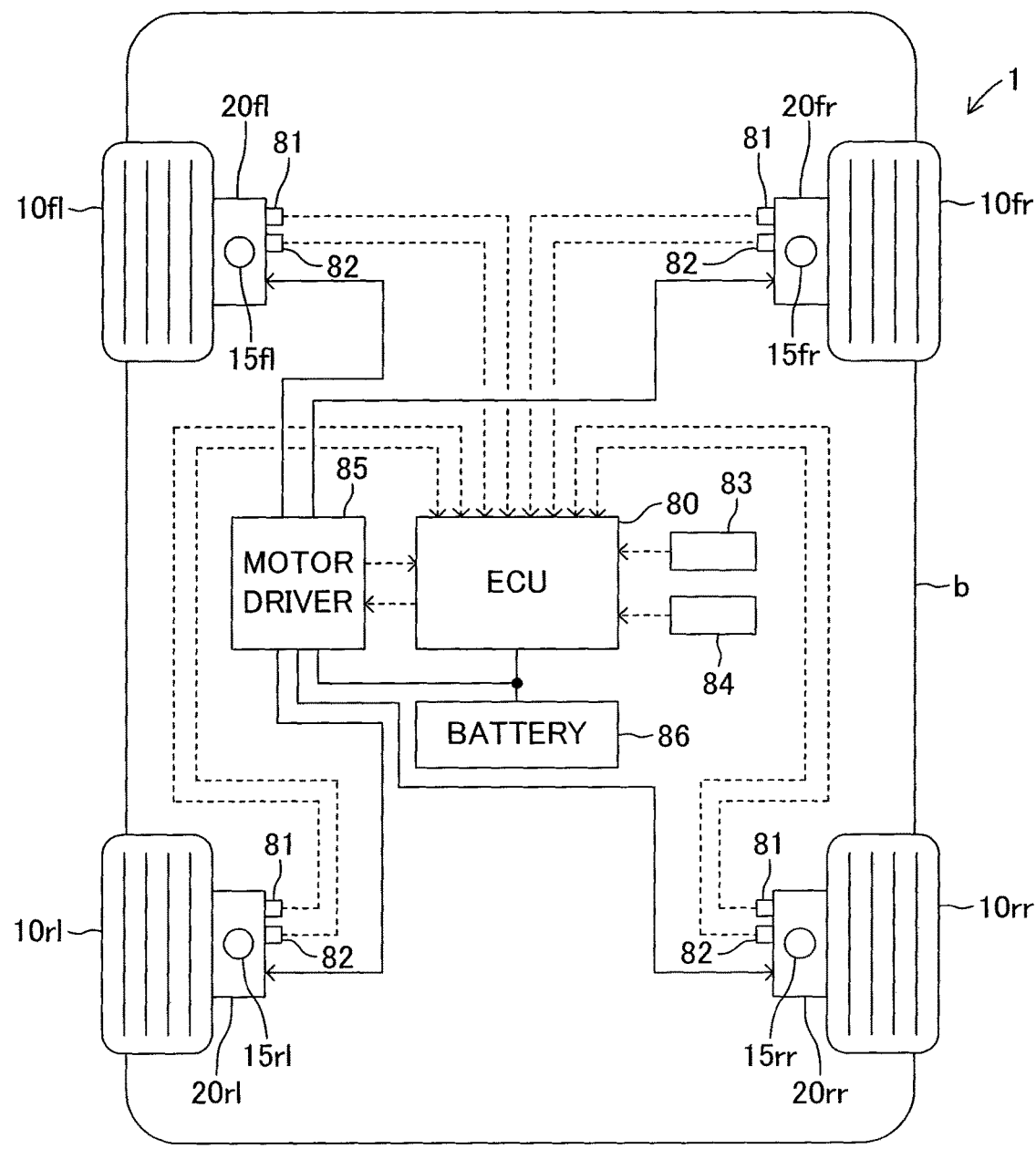
FIG. 1 is a schematic configuration diagram of a vehicle in which a motor drive control device according to an embodiment of the present invention is mounted.

A description is now given of a motor control device according to an embodiment of the present invention. FIG. 1 schematically illustrates a configuration of an in-wheel motor driven vehicle on which a motor drive control device according to this embodiment is mounted.

A vehicle 1 includes a front left wheel 10fl, a front right wheel 10fr, a rear left wheel 10rl, and a rear right wheel 10rr. In-wheel motor units 20fl, 20fr, 20rl, and 20rr are incorporated into the inside of the front left wheel 10fl, the front right wheel 10fr, the rear left wheel 10rl, and the rear right wheel 10rr, respectively. The in-wheel motor units 20fl, 20fr, 20rl, and 20rr are supported to a vehicle body b respectively by suspensions 15fl, 15fr, 15rl, and 15rr. Hereinafter, the front left wheel 10fl, the front right wheel 10fr, the rear left wheel 10rl, and the rear right wheel 10rr are simply referred to as "wheels 10" unless any one thereof is required to be specified. Similarly, the in-wheel motor units 20fl, 20fr, 20rl, and 20rr are simply referred to as "motor units 20" unless any one thereof is required to be specified, and the suspensions 15fl, 15fr, 15rl, and 15rr are simply referred to as "suspensions 15" unless any one thereof is required to be specified.

Figure 2:
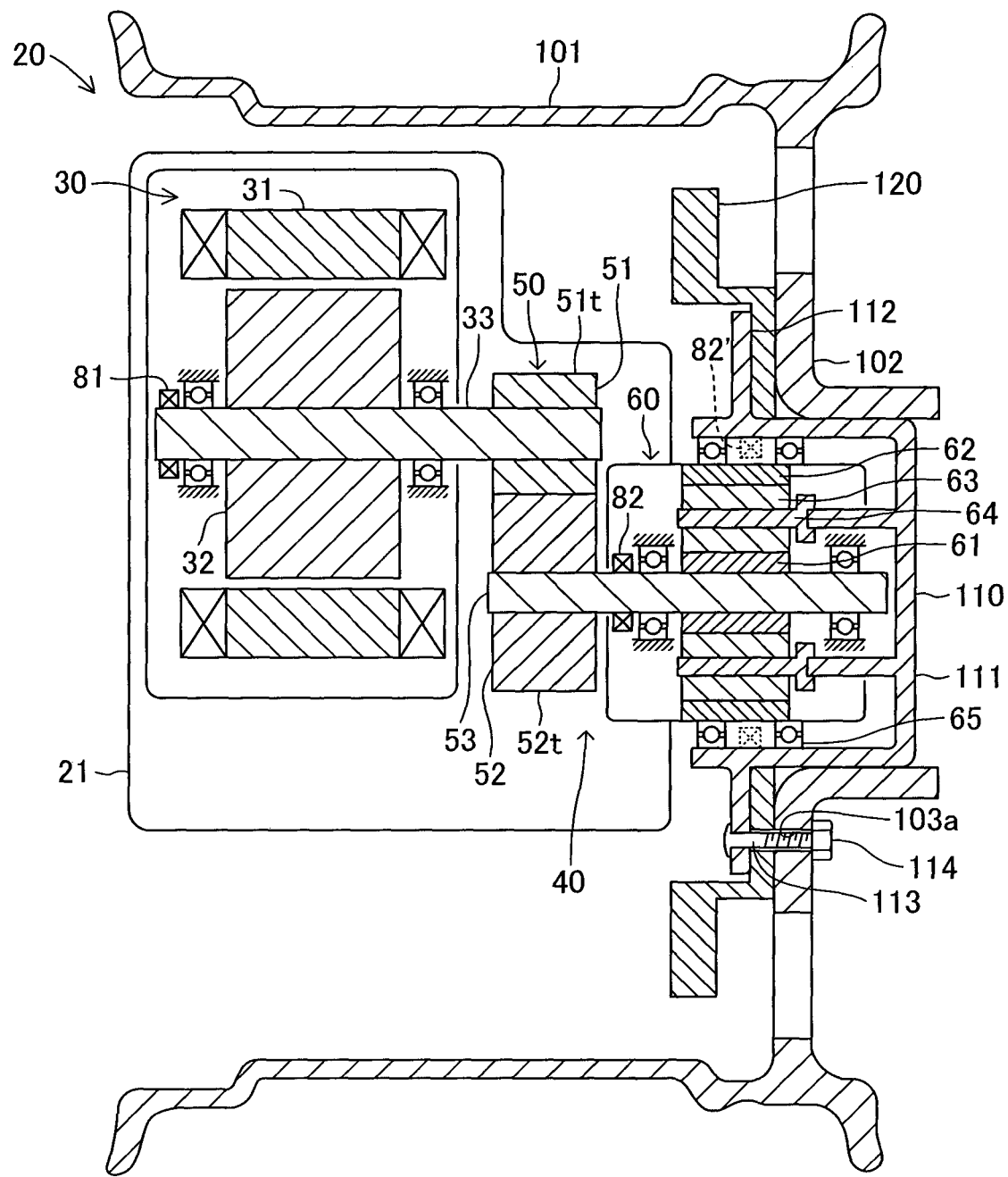
FIG. 2 is an internal structure diagram schematically illustrating a wheel into which a motor unit is incorporated as viewed from a fore-and-aft direction of the vehicle.

As illustrated in FIG. 2, the motor unit 20 is provided in a cylindrical space surrounded by a rim portion 101 and a disc portion 102 of the wheel 10. The term "in-wheel" herein means interior of the cylindrical space or the interior of the cylindrical space including the vicinity of the cylindrical space. The motor unit 20 includes a motor 30 and a speed reduction mechanism 40, which are provided inside a housing 21. The motor 30 is, for example, a three-phase brushless motor, and is connected to a motor driver 85 provided to the vehicle body b to generate a driving torque by power supplied from the motor driver 85 to a stator 31. Further, the motor 30 also functions as a power generator that generates power by rotation of a rotor 32 with a rotating force of the wheel 10 and regenerates the generated power in a battery 86 through the motor driver 85. A magnitude of the torque and a direction in which the torque is generated by the motor 30 are controlled by an electronic control unit 80 for motor control provided to the vehicle body b.

An output shaft 33 of the motor 30 is connected to the speed reduction mechanism 40. The speed reduction mechanism 40 includes a counter gear mechanism 50 and a planetary gear mechanism 60. The counter gear mechanism 50 includes a first gear 51 and a second gear 52. The first gear 51 is a driving gear having a smaller diameter and is fixed to the output shaft 33 of the motor 30, whereas the second gear 52 is a driven gear having a larger diameter and is to be brought into meshing engagement with the first gear 51. As each of the first gear 51 and the second gear 52, for example, a spur gear or a helical gear is used.

The counter gear mechanism 50 has a backlash formed between the first gear 51 and the second gear 52. When the direction of the torque of the motor 30 is reversed, the first gear 51 idles relative to the second gear 52 by the amount of the backlash. When the backlash is eliminated, a tooth 51*t* of the first gear 51 comes into abutment against a tooth 52*t* of the second gear 52 in a reverse direction. When the teeth 51*t* and 52*t* come into abutment against each other, gear rattling noise is generated. In this embodiment, the gear rattling noise due to the backlash in the counter gear mechanism 50 is reduced. Therefore, the counter gear mechanism 50 corresponds to a speed reducer of the present invention, which is a target whose gear rattling noise is to be reduced. The first gear 51 corresponds to an input-side gear of the present invention, whereas the second gear 52 corresponds to an output-side gear of the present invention.

A rotary shaft 53 of the second gear 52 is connected to the planetary gear mechanism 60. The planetary gear mechanism 60 includes a sun gear 61, a ring gear 62, a plurality of planetary gears 63, and a planetary carrier 64. The sun gear 61 is formed on an outer circumference of the rotary shaft 53 of the second gear 52. The ring gear 62 is provided coaxially with the sun gear 61. The plurality of planetary gears 63 come into meshing engagement with both the sun gear 61 and the ring gear 62 between the sun gear 61 and the ring gear 62. The planetary carrier 64 rotates by orbital motion of the planetary gears 63 that are provided at equal intervals. An axle hub 110 is connected to the planetary carrier 64.

The axle hub 110 is rotatably provided to a housing of the planetary gear mechanism 60 by bearings 65 and rotates integrally with the planetary carrier 64. The axle hub 110 includes a cylindrical portion 111 and an annular plate portion 112. The cylindrical portion 111 covers an outer side of the planetary gear mechanism 60 in a vehicle width direction. The annular plate portion 112 extends radially outward from an outer circumferential surface of the cylindrical portion 111. A brake disc rotor 120 is fixed to the annular plate portion 112. Stud bolts 113 are firmly fixed to the annular plate portion 112 at predetermined intervals along a circumferential direction so as to project from an inner side to an outer side.

The wheel 10 is fixed to the axel hub 110 in the following manner. The stud bolts 113 are inserted into through holes 103*a* formed through the wheel disc 102 in a state in which the brake disc rotor 120 is mounted to the axel hub 110. Then, nuts 114 are screwed and fastened onto the stud bolts 113 to fix the wheel 10 to the axel hub 110 in a state in which the disc brake rotor 120 is sandwiched therebetween.

Although the planetary gear mechanism 60 also has a backlash, the backlash in the planetary gear mechanism 60 is ignorably small as compared with that in the counter gear mechanism 50. Therefore, such large gear rattling noise that is audible to a driver is not generated. Thus, the planetary gear mechanism 60 is not a target whose gear rattling noise is to be reduced.

The motor unit 20 is provided with a first rotation angle sensor 81 and a second rotation angle sensor 82. The first rotation angle sensor 81 outputs a detection signal indicating a rotation angle of the output shaft 33 of the motor 30. The second rotation angle sensor 82 outputs a detection signal indicating a rotation angle of the rotary shaft 53 of the second gear 52 in the counter gear mechanism 50. Although a resolver is used as each of the first rotation angle sensor 81 and the second rotation angle sensor 82 in this embodiment, other rotation angle sensors such as an encoder can also be used.

The motor units 20 described above are provided to the respective wheels 10 and have the same configuration. Each of the motor units 20 transmits the torque generated by the motor 30 to the corresponding wheel 10 through the speed reduction mechanism 40. Each of the motors 30 is connected to the motor driver 85. The motor driver 85 is, for example, an inverter. The four motor drivers 85 are provided so as to correspond to the respective motors 30 and convert DC power supplied from the battery 86 into AC power so as to supply the obtained AC power to the respective motors 30. In this manner, each of the motors 30 generates the torque and applies a driving force to the corresponding wheel 10. Each of the motors 30 also functions as a power generator and can generate power by rotation energy of each of the wheels 10 to regenerate the generated power in the battery 86 through the motor driver 85. A braking torque generated by the power generated by the motor 30 applies a braking force to the corresponding wheel 10.

The motor driver 85 is connected to the electronic control unit 80 for motor control. The electronic control unit 80 for motor control (hereinafter referred to as "motor ECU 80") includes a microcomputer constructed by a CPU, a ROM, and a RAM as a main component, and executes various programs to independently control the operations of the individual motors 30. The motor ECU 80 is connected to the two rotation angle sensors 81 and 82 (the first rotation angle sensor 81 and the second rotation angle sensor 82) provided to each of the motor units 20 so that the detection signals output from the respective rotation angle sensors 81 and 82 are input thereto.

The first rotation angle sensor 81 is used for phase control (detection of an electric angle) of the motor 30, whereas the second rotation angle sensor 82 is used for detection of a wheel speed. The rotation angle detected by the first rotation angle sensor 81 and the rotation angle detected by the second rotation angle sensor 82 are also used to detect a meshing engagement state (backlash B described later) between the tooth 51*t* of the first gear 51 and the tooth 52*t* of the second gear 52 in the counter gear mechanism 50.

Further, the motor ECU 80 is connected to an operation state detection device 83 for detecting an operation state of operations performed by the driver to control the vehicle to travel and a motion state detection device 84 for detecting a motion state of the vehicle so that the detection signals output from the detection devices 83 and 84 are input thereto.

The operation state detection device 83 is constructed by an accelerator sensor for detecting an accelerator operation amount by the driver based on a depressing amount (or an angle or a pressure) of an accelerator pedal, a brake sensor for detecting a brake operation amount by the driver based on a depressing amount (or an angle or a pressure) of a brake pedal, a steering angle sensor for detecting a steering operation amount of an operation on a steering wheel by the driver, and the like. The motion state detection device 84 is constructed by an appropriate combination of a vehicle speed sensor for detecting a travel speed of the vehicle body b, a yaw rate sensor for detecting a yaw rate of the vehicle body b, a sprung mass acceleration sensor for detecting an acceleration in the vertical direction of the vehicle body b (sprung mass) at each wheel position, a lateral acceleration sensor for detecting a lateral acceleration in the lateral direction of the vehicle body b, a pitch rate sensor for detecting a pitch rate of the vehicle body b, a roll rate sensor for detecting a roll rate of the vehicle body b, a stroke sensor for detecting a stroke amount of each suspension 15, an unsprung mass acceleration sensor for detecting a vertical acceleration in the vertical direction of an unsprung mass of the each wheel 10, and the like.

The wheel 10 is coupled to the vehicle body b by the suspension 15. The driving force and the braking force on the wheel 10 are converted into a force in the vertical direction of the vehicle body b by a suspension link mechanism. An orientation of the force acting on the vehicle body b in the vertical direction is determined by geometry of the suspensions 15. For example, in a vehicle in which an instantaneous rotation center of the suspensions 15 of the front wheels 10f is located behind and above the front wheels 10f and an instantaneous rotation center of the suspensions 15 of the rear wheels 10r is located ahead of and above the rear wheels 10r, a force in a direction in which the vehicle body b sinks is generated at a grounding point of each of the front wheels 10f when the driving torque is applied to the front wheels 10f, and a force in a direction in which the vehicle body b is biased upward is generated at the grounding point of each of the front wheels 10f when the braking torque is applied to the front wheels 10f. Moreover, the force in the direction in which the vehicle body b is biased upward is generated at a grounding point of each of the rear wheels 10r when the driving torque is applied to the rear wheels 10r, and the force in the direction in which the vehicle body b sinks is generated at the grounding point of each of the rear wheels 10r when the braking torque is applied to the rear wheels 10r. Therefore, through independent control of the driving force and the braking force (referred to as "braking/driving force") to each of the wheels 10, the vertical force can be applied to the vehicle body b so as to control a motion state of the vehicle. For example, in a case where the vehicle body b on the side of the front wheels 10f moves downward while the vehicle is running, the braking torque is applied to the motors 30 of the front wheels 10f to bias the vehicle body b on the side of the front wheels 10f upward to suppress the downward movement of the vehicle body b.

The motor ECU 80 calculates a driver-requested driving force Freq based on the accelerator operation amount detected by the operation state detection device 83, and calculates a control braking/driving force Fc independently for each of the wheels 10 based on the vehicle motion state detected by the motion state detection device 84. The motor ECU 80 distributes the driver-requested driving force Freq to the four wheels (divides into quarters, for example) to calculate a driver-requested distributed driving force Fd on the each wheel 10. Then, the motor ECU 80 sets a sum of the driver-requested distributed driving force Fd and the control braking/driving force Fc as a target braking/driving force F* (=Fd+Fc) for each of the wheels 10. The motor ECU 80 calculates a target torque T* corresponding to the target braking/driving force F* and controls a switching element of the motor driver 85 so that each of the motors 30 generates the target torque T*.

For the control braking/driving force Fc, the direction of the torque is determined depending on the motion state of the vehicle. Therefore, the target torque T* is reversed from positive to negative or from negative to positive. Specifically, an operation of the motor 30 is switched from a power running operation to a regenerative operation or from the regenerative operation to the power running operation. Each time the direction of the motor torque is switched, the backlash between the first gear 51 and the second gear 52 is eliminated to generate the gear rattling noise in the counter gear mechanism 50. Therefore, in this embodiment, a control program for reducing the gear rattling noise in the counter gear mechanism 50 is stored in the microcomputer of the motor ECU 80. The control program is configured to be executed when the target torque T* is reversed.

In a case where a brake pedal operation is performed, the motor ECU 80 calculates the negative driver-requested driving force Freq (regenerative braking force) based on the brake operation amount. Therefore, when an accelerator operation is switched to the brake operation or the brake operation is switched to the accelerator operation, the target torque T* is reversed from positive to negative or from negative to positive. Even in this case, the motor ECU 80 executes the control program for reducing the gear rattling noise in the counter gear mechanism 50.

Figure 3:
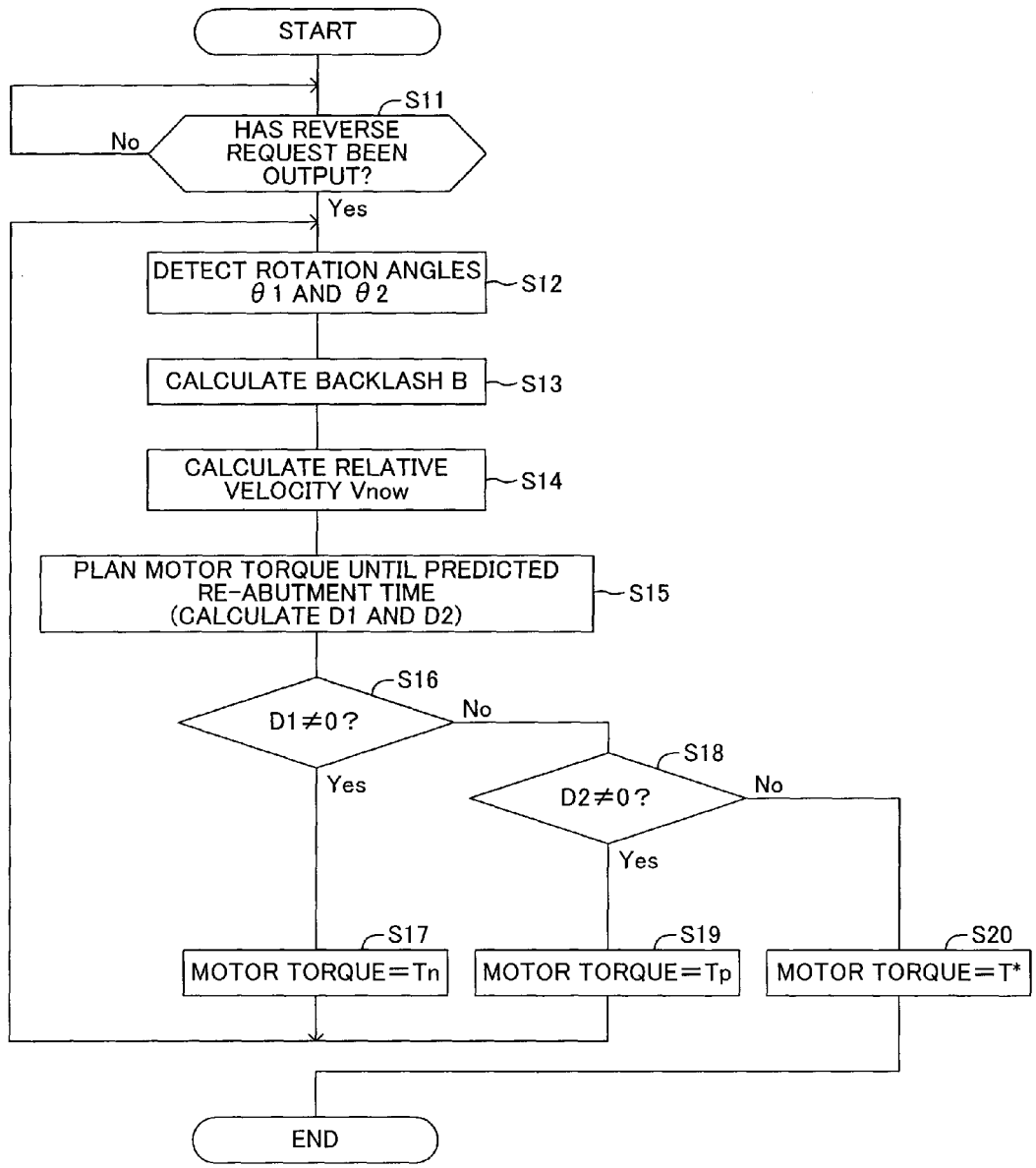
FIG. 3 is a flowchart illustrating a gear rattling noise reduction control routine.

Next, gear rattling noise reduction control processing executed by the motor ECU 80 is described. FIG. 3 is a flowchart illustrating a gear rattling noise reduction control routine. Here, prior to description of the gear rattling noise reduction control routine, a principle of reduction of the gear rattling noise and definitions of terms are first described.

When the direction of the torque is reversed in a state in which the motor 30 generates the torque, the torque generated by the motor 30 is switched from the driving torque to the braking torque. Therefore, the abutment between the tooth 51t of the first gear 51 and the tooth 52t of the second gear 52 of the counter gear mechanism 50 is released (referred to as "abutment release"). When the first gear 51 rotates relative to the second gear 52 in the reverse direction by the amount of a backlash, the tooth 51t of the first gear 51 and the tooth 52t of the second gear 52 come into abutment against each other again (referred to as "re-abutment"). The gear rattling noise reduction control processing adjusts the motor torque (braking torque or driving torque) in the idling time period from the time of abutment release to the time of re-abutment to perform control so that a moving velocity of the tooth 51t of the first gear 51 in a circumferential direction becomes closer to that of the tooth 52t of the second gear 52 in the circumferential direction at the time of re-abutment, thereby reducing the gear rattling noise. Hereinafter, the moving velocity in the circumferential direction is referred to as "circumferential velocity".

Figure 4:
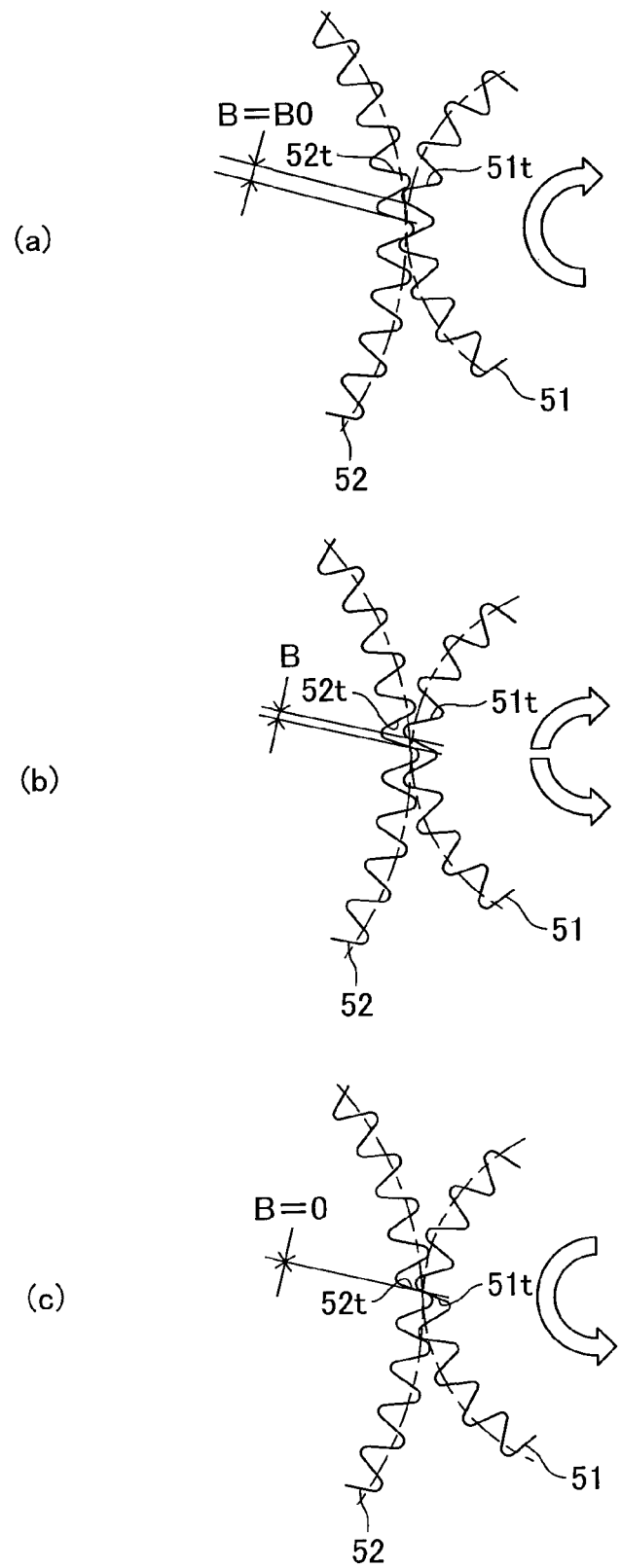
FIGS. 4A to 4C are explanatory diagrams illustrating a meshing engagement state in a counter gear mechanism.

A position at which the tooth 51t of the first gear 51 and the tooth 52t of the second gear 52 come into abutment against each other differs depending on the direction of the torque generated by the motor 30. A position at which the tooth 51t of the first gear 51 comes into abutment against the tooth 52t of the second gear 52 when the motor 30 generates the torque in a first direction so that the first gear 51 rotates the second gear 52 as illustrated in FIG. 4A is referred to as "first-direction side abutment position". A position at which the tooth 51t of the first gear 51 comes into abutment against the tooth 52t of the second gear 52 when the motor 30 generates the torque in a second direction (direction opposite to the first direction) so that the first gear 51 rotates the second gear 52 as illustrated in FIG. 4C is referred to as "second-direction side abutment position". Moreover, a state in which the tooth 51t of the first gear 51 is held in abutment against the tooth 52t of the second gear 52 at the first-direction side abutment position is referred to as "first-direction abutment state", whereas a state in which the tooth 51t of the first gear 51 is held in abutment against the tooth 52t of the second gear 52 at the second-direction side abutment position is referred to as "second-direction abutment state". In this embodiment, the description is given regarding the direction of the torque immediately before the direction of the target torque T* is reversed (the driving torque is switched to the braking torque) as the first direction.

The motor ECU 80 obtains a relative position between the tooth 51t of the first gear 51 and the tooth 52t of the second gear 52 based on the rotation angle of the first gear 51, which is detected by the first rotation angle sensor 81, and the rotation angle of the second gear 52, which is detected by the second rotation angle sensor 82, during the idling time period so that the circumferential velocity of the tooth 51t of the first gear 51 is made closer to that of the tooth 52t of the second gear 52 at the time of re-abutment. In this embodiment, the backlash B is used as a parameter indicating the relative position. Here, when the direction of the motor torque is reversed in the first-direction abutment state, a relative movement amount (distance in the circumferential direction) of the tooth 51t relative to the tooth 52t, which is required for the tooth 51t to come into abutment against the tooth 52t at the second-direction side abutment position, with reference to the relative position at a current time between the tooth 51t of the first gear 51 and the tooth 52t of the second gear 52, is defined as the backlash B.

Immediately before the motor torque is reversed, the tooth 51t of the first gear 51 and the tooth 52t of the second gear 52 are held in abutment against each other at the first-direction side abutment position, as illustrated in FIG. 4A. Therefore, the backlash B has a maximum value. The backlash B having the maximum value is referred to as "initial backlash B0". The initial backlash B0 is defined uniquely from a structure of the counter gear mechanism 50. When the direction of the motor torque is reversed, the abutment between the tooth 51t of the first gear 51 and the tooth 52t of the second gear 52 is released. Then, the tooth 51t of the first gear 51 moves in the second direction relative to the tooth 52t of the second gear 52. With this relative movement, the backlash B decreases as illustrated in FIG. 4B. FIG. 4C illustrates a state in which the tooth 51t of the first gear 51 and the tooth 52t of the second gear 52 come into abutment against each other again so that the backlash B becomes zero.

If the direction of the motor torque is maintained in the second direction after the motor torque is reversed, the relative velocity in the circumferential direction between the tooth 51t and the tooth 52t becomes large at the time of re-abutment between the first gear 51 and the second gear 52. As a result, the gear rattling noise is generated. Therefore, in the gear rattling noise reduction control processing, the direction of the motor torque is switched from the second direction (braking torque) to the first direction (driving torque) in the middle of the idling time period of the first gear 51 so that the circumferential velocity of the tooth 51t of the first gear 51 is made closer to that of the tooth 52t of the second gear 52. In this manner, the circumferential velocity of the tooth 51t and that of the tooth 52t can be substantially matched with each other at the time when the first gear 51 comes into abutment against the second gear 52 again. In FIGS. 4A to 4C, the arrows on the first gear 51 indicate the direction of the motor torque. The two arrows illustrated in FIG. 4B indicate that the direction of the motor torque is switched from the second direction to the first direction in the middle of the idling time period.

The backlash B can be calculated in the following manner.

It is assumed that the rotation angle of the first gear 51, which is detected by the first rotation angle sensor 81, is a first rotation angle Θ1, the rotation angle of the second gear 52, which is detected by the second rotation angle sensor 82, is a second rotation angle Θ2, and a conversion coefficient for converting the rotation angle of the second gear 52 into the rotation angle of the first gear 51 is k (=number of teeth of the second gear 52/number of teeth of the first gear 51). Then, the rotation angle obtained by converting the second rotation angle Θ2 into the rotation angle of the first gear 51 is k·Θ2.

A relative rotational position Θ of the first gear 51 with respect to the second gear 52 is expressed by Expression (1).

$$\Theta = \Theta 1 - k \cdot \Theta 2 \quad (1)$$

It is assumed that the relative rotational position Θ when the meshing engagement between the first gear 51 and the second gear 52 is in the first-direction abutment state is Θp, the relative rotational position Θ when the meshing engagement between the first gear 51 and the second gear 52 is in the second-direction abutment state is Θn, and a radius of the first gear 51 from a center of rotation to a meshing portion is R. Then, the initial backlash B0 is expressed by Expression (2).

$$B0 = R \times (|\Theta p - \Theta n|) \quad (2)$$

The initial backlash B0 has a constant value. The motor ECU 80 calculates the initial backlash B0 at arbitrary timing and stores the calculated initial backlash B0 in a memory.

When the direction of the motor torque is reversed in a state in which the motor 30 is rotating in the first direction, the backlash B decreases from the initial backlash B0. It is assumed that the relative rotational position Θ immediately before the direction of the motor torque is reversed is an initial relative rotational position Θ0 and the relative rotational position Θ at the current time is a current relative rotational position Θx. Then, a value obtained by multiplying a difference (|Θx−Θ0|) between the current relative rotational position Θx and the initial relative rotational position Θ0 by the radius R (R·(|Θx−Θ0|)) is the amount of decrease in backlash. Therefore, the backlash B at the current time is expressed by Expression (3).

$$B = B0 - R \cdot (|\Theta x - \Theta 0|) \quad (3)$$

Although the backlash B is expressed by a distance in the description herein, the backlash B may be expressed by the rotation angle of the first gear 51.

Figure 5:
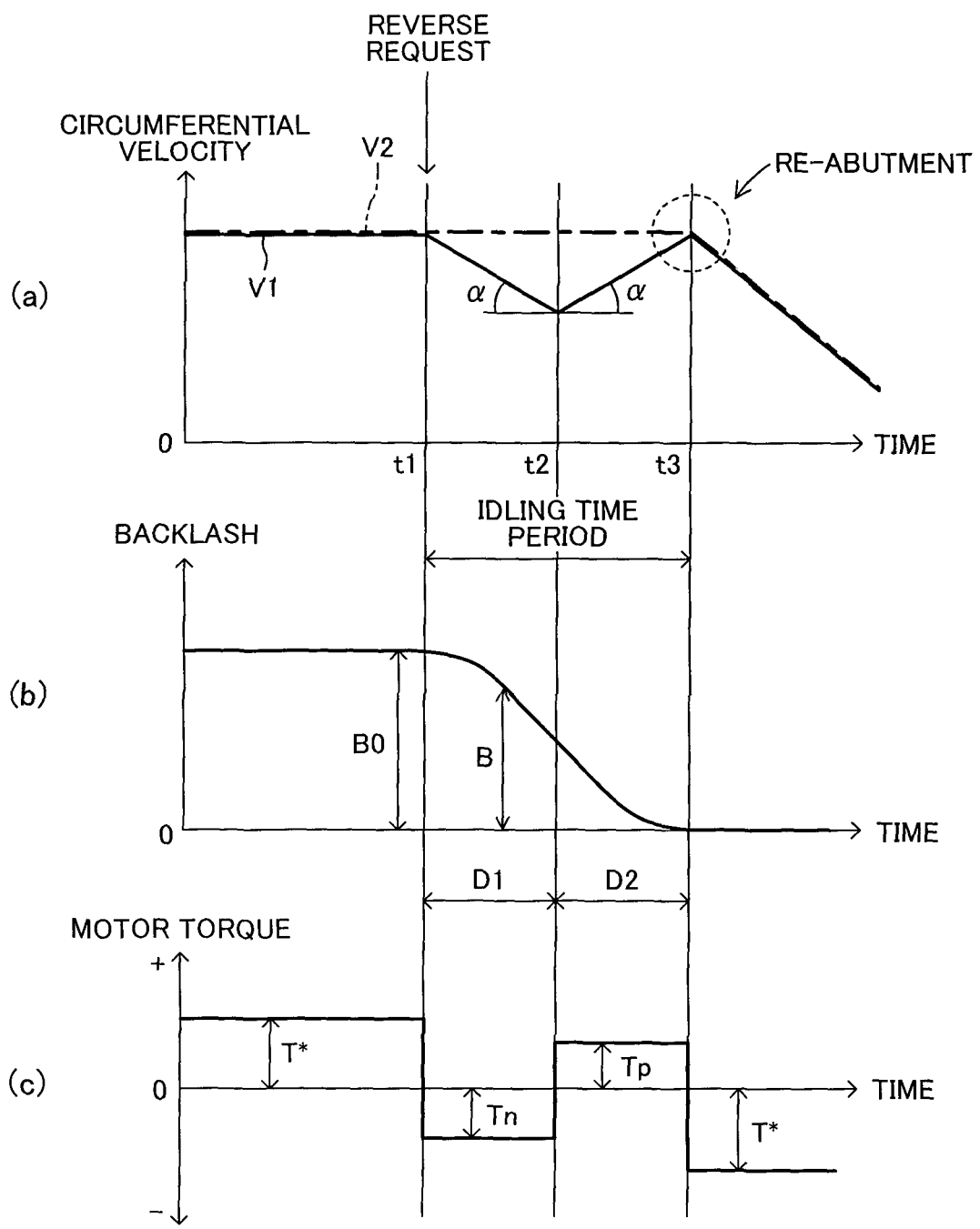
FIG. 5 is a graph showing a transition of a circumferential velocity, a backlash, and a motor torque in a case where a motor-torque reverse request is output.

In the gear rattling noise reduction control processing, the motor ECU 80 controls the rotation speed of the motor 30 so that the circumferential velocity of the tooth 51t of the first gear 51 (referred to as "first gear circumferential velocity V1") and the circumferential velocity of the tooth 52t of the second gear 52 (referred to as "second gear circumferential velocity V2") are substantially matched with each other at the time of re-abutment between the first gear 51 and the second gear 52. For example, as shown in FIG. 5, when a motor-torque reverse request is output, specifically, the direction (sign) of the target torque T* is reversed at a time t1, a set torque in a direction (second direction) opposite to the direction of the motor torque (first direction) immediately before the reverse request is output (referred to as "reverse set torque Tn") is generated by the motor 30 (see part (c) of FIG. 5). The reverse set torque Tn is a braking torque that is preset to have a certain magnitude. In this manner, the abutment between the first gear 51 and the second gear 52 is released, and hence the first gear 51 starts idling. By the idling, the first gear circumferential velocity V1 decreases with a constant gradient α (see part (a) of FIG. 5). Therefore, a relative velocity V (=V2−V1) between the first gear circumferential velocity V1 and the second gear circumferential velocity V2 increases as expressed as a product (α·tx) of elapsed time tx from the time t1 and the gradient α. Simultaneously, the backlash B decreases. The amount of decrease in the backlash B is expressed as a time integrated value of the product (α·tx). The gradient α is a circumferential velocity change coefficient that is determined in accordance with the magnitude of the motor torque, and is prestored in the motor ECU 80.

In the gear rattling noise reduction control processing, the motor ECU 80 switches the motor torque from the reverse set torque Tn to a return set torque Tp in the middle of a time period in which the first gear 51 is idling (see part (c) of FIG. 5). The return set torque Tp is a preset constant driving torque that has the same magnitude (absolute value) as the reverse set torque Tn and the direction (sign) opposite to that of the reverse set torque Tn. In the example shown in FIG. 5, at a time t2, the motor torque is switched from the reverse set torque Tn to the return set torque Tp. As a result, the first gear circumferential velocity V1 starts increasing with the constant gradient α at the time t2. Therefore, the relative velocity V (=V2−V1) between the first gear circumferential velocity V1 and the second gear circumferential velocity V2 starts decreasing with the gradient α at the time t2. Simultaneously, the backlash B starts decreasing.

As a result of the decreased backlash B, the tooth 51t of the first gear 51 comes into abutment against the tooth 52t of the second gear 52 again at a time t3. As the relative velocity V at the time of re-abutment, specifically, when the backlash B becomes zero, is closer to zero, the gear rattling noise can be further reduced. Therefore, in the gear rattling noise reduction control processing, a motor rotation speed is controlled so that the relative velocity V at the time of re-abutment becomes zero (the teeth 51t and 52t come into abutment against each other again at the timing at which the relative velocity V becomes zero). The motor ECU 80 plans a time period D1 in which the reverse set torque Tn is generated and a time period D2 in which the return set torque Tp is generated, and controls the motor 30 to generate the torque in accordance with the plan. As a result, the relative velocity V at the time of re-abutment is controlled as described above.

Figure 6:
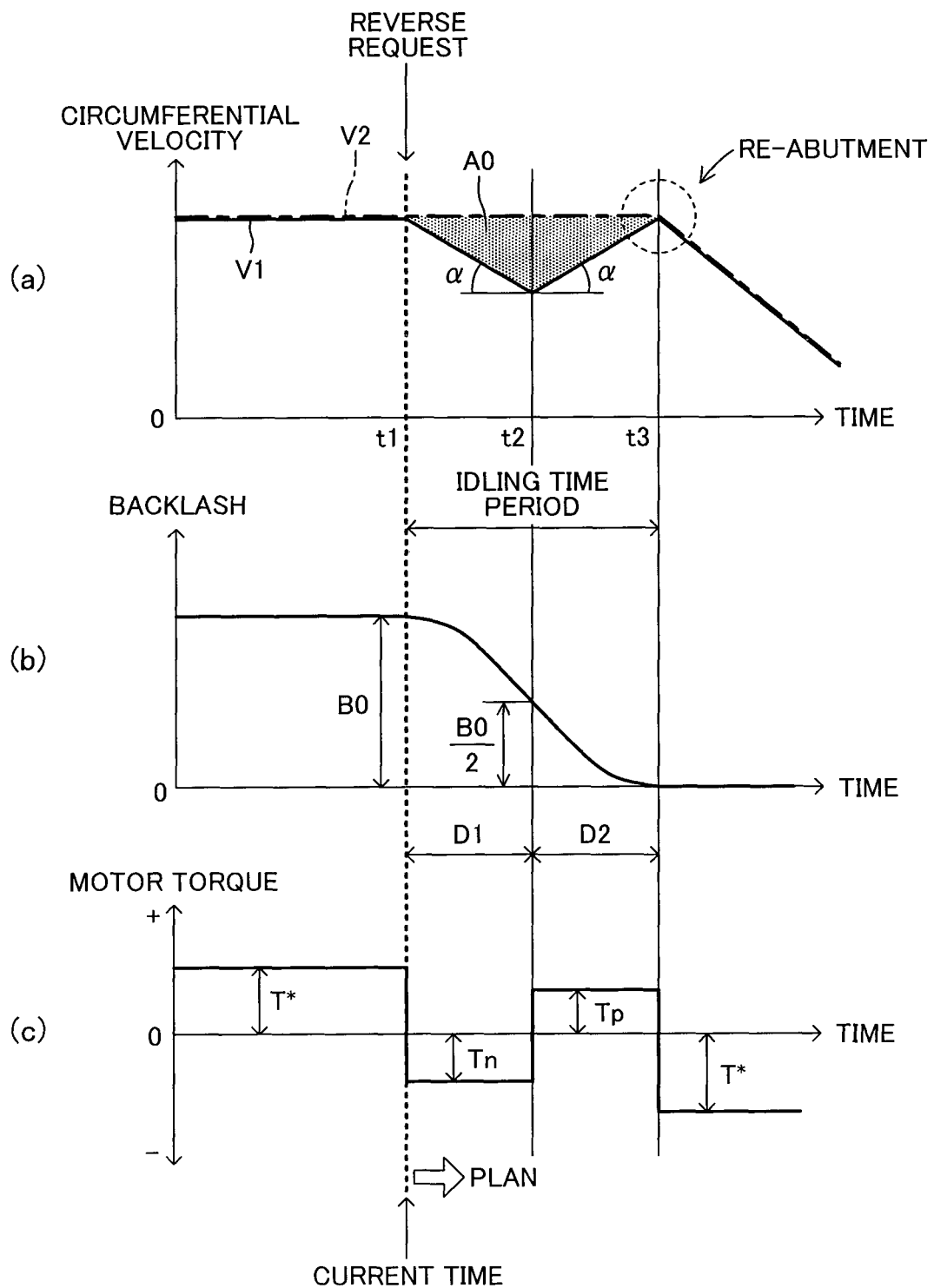
FIG. 6 is a graph showing a plan of the motor torque in the case where the motor-torque reverse request is output.

The value obtained by integrating the relative velocity V by time corresponds to the amount of decrease in the backlash B. Therefore, in order to control the relative velocity V to become zero at a moment at which the backlash B becomes zero, the time periods D1 and D2 need to be set so that a value obtained by integrating a predicted relative velocity V (=predicted approach velocity) from the current time to the time of re-abutment by time becomes equal to the backlash B at the current time. For example, when the current time is immediately after the output of the reverse request for the motor torque (at the time of abutment release), an area A0 of a solid gray region in part (a) of FIG. 6 corresponds to the value obtained by integrating the predicted relative velocity V from the current time to the time of re-abutment by time. In this case, by setting the time periods D1 and D2 so that the area A0 becomes equal to the initial backlash B0, the relative velocity V at the time of re-abutment (time t3) can be set to zero. The time periods D1 and D2 can be calculated geometrically. In this case, D1=D2 holds. Therefore, at the time when the backlash B becomes half the initial backlash B0 (B0/2), the reverse set torque Tn needs to be switched to the return set torque Tp. As a result, at the end of the time period D2, the relative velocity V becomes zero. After the re-abutment, the motor torque is set to the target torque T* at the time when the reverse request is output.

Unless the second gear circumferential velocity V2 changes in the middle of the idling time period under the influence of a disturbance (input from a road surface to the wheel 10), the relative velocity V at the time of re-abutment can be set to zero as long as the reverse set torque Tn and the return set torque Tp are generated in accordance with the initially planned time periods D1 and D2. Specifically, if the reverse set torque Tn is switched to the return set torque Tp at the time when the backlash B becomes half the initial backlash B0 (B0/2), the relative velocity V at the time of re-abutment can be set to zero. In this manner, the gear rattling noise can be reduced.

Figure 7:
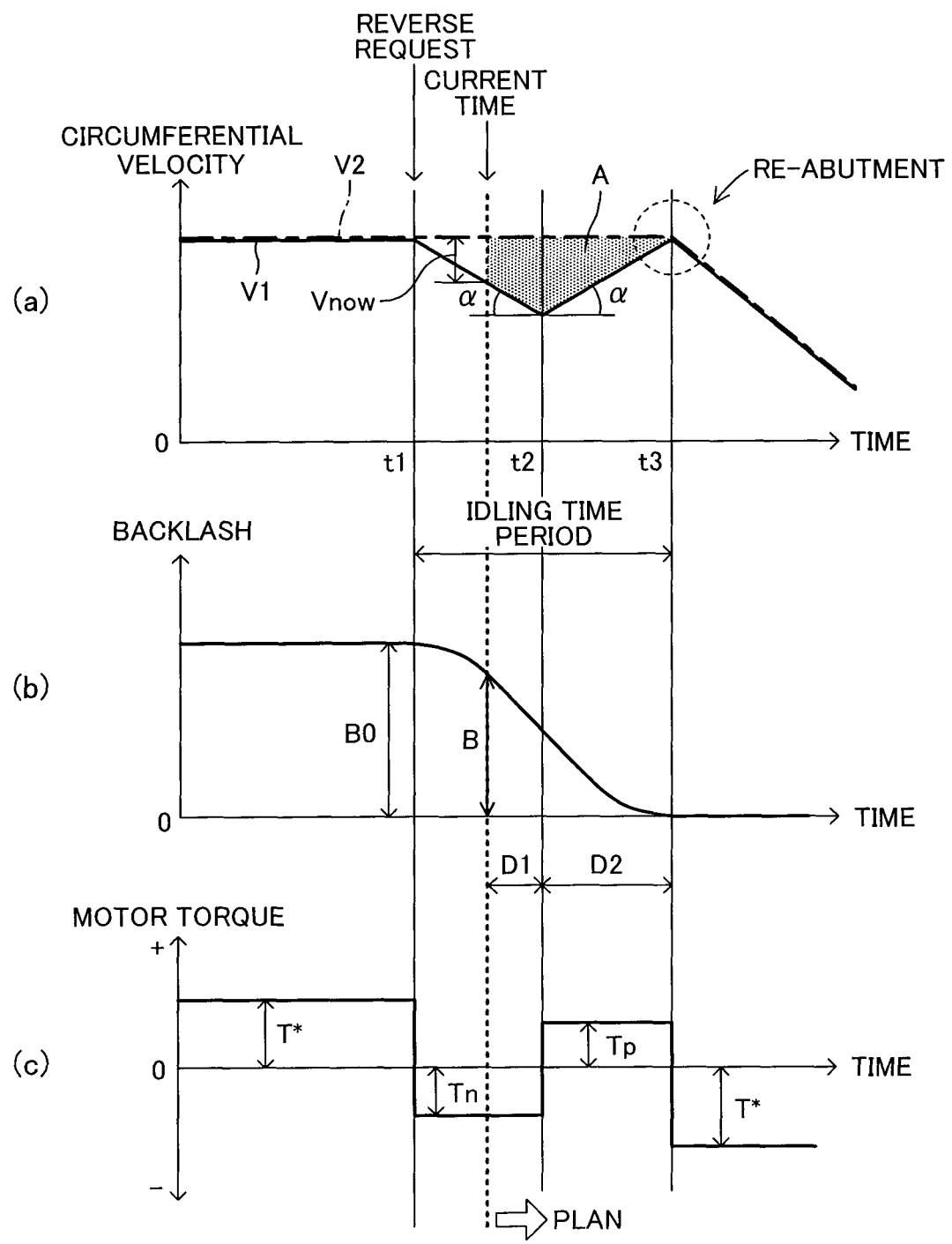
FIG. 7 is a graph showing the plan of the motor torque in the middle of an idling time period.

In a case where the second gear circumferential velocity V2 changes in the middle of the idling time period under the influence of the disturbance input to the wheel 10, however, the relative velocity V does not transition as supposed. Therefore, if the time periods D1 and D2 that are planned at the time of abutment release are directly used, the relative velocity V at the time of re-abutment cannot be set to be zero. Therefore, in this embodiment, as shown in FIG. 7, an area A (area of a solid gray region) over the time period from the current time to the time of re-abutment is used to update the plan of the time periods D1 and D2 is sequentially updated so that the area A becomes equal to the backlash B at the current time. The area A is an integrated value obtained by integrating the predicted relative velocity V (=predicted approach velocity) from the current time to an estimated re-abutment time (time at which the predicted relative velocity V becomes zero) by time. The predicted relative velocity V is obtained by adding a predicted relative-velocity change amount (α×elapsed time from the current time) to the relative velocity V (=V2−V1) at the current time.

For example, the area A in the time period from the current time to the time of re-abutment is obtained geometrically by Expression (4) using FIG. 7.

$$A = V_{now} \cdot D1 + (\alpha/2) \cdot D1^2 + (\alpha/2) \cdot D2^2 \qquad (4)$$

Here, Vnow is the relative velocity V at the current time, D1 is a length of the time period (time) from the current time in which the reverse set torque Tn is generated, and D2 is a length of the time period (time) in which the return set torque Tp is generated. The sum of a first term and a second term of the right side of Expression (4) corresponds to an area in the time period D1, whereas a third term of the right side corresponds to an area in the time period D2. The relative velocity Vnow is obtained as a difference between a first gear circumferential velocity V1now and a second gear circumferential velocity V2now (V2now−V1now). The first gear circumferential velocity V1now is obtained by converting a rotational angular velocity at the current time, which is calculated by time derivative of the first rotation angle Θ1, into the circumferential velocity of the tooth 51t of the first gear 51, whereas the second gear circumferential velocity V2now is obtained by converting a rotational angular velocity at the current time, which is calculated by time derivative of the second rotation angle Θ2, into the circumferential velocity of the tooth 52t of the second gear 52.

In order to set the relative velocity V at the time of re-abutment to be zero, a relationship expressed by Expression (5) needs to be set.

$$\alpha \cdot D2 = V\text{now} + \alpha \cdot D1 \quad (5)$$

From Expression (5), D2 is expressed by Expression (6) using D1.

$$D2 = V\text{now}/\alpha + D1 \quad (6)$$

By substituting the backlash B at the current time for A in Expression (4) and Expression (6) for D2 in Expression (4), Expression (4) is transformed into Expression (7).

$$B = V\text{now} \cdot D1 + (\alpha/2) \cdot D1^2 + (\alpha/2) \cdot (V\text{now}/\alpha + D1)^2 \quad (7)$$

By expressing Expression (7) in a quadratic equation of D1, Expression (8) is obtained.

$$\alpha \cdot D1^2 + 2V\text{now} \cdot D1 + (V\text{now}^2/(2\alpha) - B) = 0 \quad (8)$$

By solving Expression (8), the time period D1 from the current time in which the reverse set torque Tn is continued can be calculated. Moreover, the time period D2 in which the return set torque Tp is generated can be calculated by substituting the calculated D1 for Expression (6). In this case, when a solution of D1 is not obtained as a positive value, the current time is contained in the time period D2, specifically, the current time is contained in the time period in which the return set torque Tp is generated. Thus, D1=0 is set. When the backlash B has a smaller value than (Vnow$^2$/(2$\alpha$)), there is no positive value of D1 that satisfies Expression (8). Therefore, the current time is contained in the time period D2 in which the return set torque Tp is generated. In this case, D2 is calculated by substituting D1=0 in Expression (6). When Vnow becomes equal to or smaller than zero, D2 is set to be zero (D2=0). At timing at which D2 becomes zero, the torque generated by the motor 30 is switched to the original target torque T*.

Now, the gear rattling noise reduction control routine executed by the motor ECU 80 is described referring to a flowchart of FIG. 3. The gear rattling noise reduction control routine is executed independently for each of the motors 30 of the respective wheels 10. In this case, the gear rattling noise reduction control routine for the motor 30 provided to an arbitrary one of the wheels 10 is described. The gear rattling noise reduction control routine is executed when the motor 30 is driven, specifically, when the target torque T* is not zero.

In Step S11, the motor ECU 80 determines whether or not the reverse request for the target torque T* (target torque that is set by the target braking/driving force F*) is generated. The motor ECU 80 calculates the target torque T* for each of the motors 30 in predetermined calculation cycles. In Step S11, the motor ECU 80 determines whether or not the direction (sign) of the target torque T* is reversed. The motor ECU 80 repeats the determination in Step S11 in the same cycles as the calculation cycles of the target torque T*. When the reverse request for the target torque T* is generated, the processing proceeds to Step S12.

In Step S12, the motor ECU 80 reads the first rotation angle Θ1 detected by the first rotation angle sensor 81 and the second rotation angle Θ2 detected by the second rotation angle sensor 82. Subsequently, in Step S13, the motor ECU 80 calculates the backlash B at the current time by using Expression (3). The motor ECU 80 repeatedly executes the processing in Step S12 and the subsequent steps in the predetermined calculation cycles. When the backlash B is calculated in Step S13 for the first time, the initial relative rotational position Θ0 that is required for the calculation, that is, the initial relative rotational position Θ0 that is the relative rotational position Θ at the time when the reverse request is generated, is stored in the memory.

Subsequently, in Step S14, the motor ECU 80 calculates the relative velocity Vnow at the current time in the above-mentioned manner (Vnow=V2now−V1now). Subsequently, in Step S15, the motor ECU 80 creates the motor torque plan from the current time to the predicted re-abutment time. For example, the motor ECU 80 calculates the lengths (times) of the time periods D1 and D2 by the above-mentioned calculation expressions.

Subsequently, in Step S16, the motor ECU 80 determines whether or not D1 is other than zero. Specifically, the motor ECU 80 determines whether or not the current time is contained in the time period D1 on the motor torque plan. Immediately after the generation of the reverse request for the target torque T*, the relative velocity Vnow in Expression (8) is zero. Therefore, there exists D1 having a positive value. Therefore, the motor ECU 80 determines as "Yes". Then, the processing proceeds to Step S17. In Step S17, the motor ECU 80 sets the torque to be generated by the motor to the reverse set torque Tn. In this manner, the motor ECU 80 controls the switching element of the motor driver 85 so that the motor 30 generates the reverse set torque Tn. Specifically, the reverse set torque Tn, which is different from the target torque T* at the time of output of the reverse request, is generated.

After the processing in Step S17 is completed, the motor ECU 80 returns the processing to Step S12 to repeat the processing in the predetermined calculation cycles. Therefore, the creation of the motor torque plan is repeated. During a period in which it is determined that D1 is other than zero (S16: Yes), the motor 30 generates the reverse set torque Tn. Therefore, as shown in the time period from the time t1 to the time t2 of FIG. 5, the relative velocity (V2−V1) increases with the gradient α, while the backlash B decreases. With the decrease in the backlash B, D1 (remaining D1 at the current time) also decreases.

Then, in Step S16, when it is determined that D1=0, specifically, the current time is out of the time period D1, the motor ECU 80 determines in Step S18 whether or not D2 is other than zero. Specifically, the motor ECU 80 determines whether or not the current time is contained in the time period D2 on the motor torque plan. The time period D2 is calculated as Vnow/α by substituting D1=0 in Expression (6). Therefore, during a period in which the relative velocity Vnow at the current time does not become zero or lower, D2 is maintained to have a positive value. Therefore, at the end of the time period D1, the current time is contained in the time period D2 (S18: Yes). In this case, in Step S19, the motor ECU 80 sets the torque to be generated by the motor 30 to the return set torque Tp. In this manner, the ECU 80 controls the switching element of the motor driver 85 so that the motor 30 generates the return set torque Tp. Specifically, the return set torque Tp having the direction opposite to that of the reverse set torque Tn and having an equal absolute value is generated.

After the processing in Step S19 is completed, the motor ECU 80 returns the processing to Step S12 to repeat the processing in the predetermined calculation cycles. During a period in which the return set torque Tp is generated, the relative velocity V decreases as shown in the time period from the time t2 to the time t3 of FIG. 5. In this manner, in Step S18, when it is determined that D2=0, specifically, the current time is out of the time period D2, the motor ECU 80 switches the torque to be generated by the motor 30 to the original target torque T* (torque for generating the target braking/driving force F* (=Fd+Fc)) in Step S20 and terminates the gear rattling noise reduction control routine. Therefore, the control is returned to normal control corresponding to a control mode in which the driving of the motor 30 is controlled in accordance with the target torque T*. The gear rattling noise reduction control routine is restarted after a predetermined short interval elapses. Therefore, at the time when the reverse request for the target torque T* is generated next, the processing in Step S12 and the subsequent steps is executed.

According to the gear rattling noise reduction control routine described above, when the reverse request for the target torque T* is output, the rotation speed of the motor 30 is controlled so that the circumferential velocity of the tooth 51t of the first gear 51 and the circumferential velocity of the tooth 52t of the second gear 52 at the time of re-abutment become equal to each other. Specifically, the rotation speed of the motor 30 is controlled so that the tooth 51t of the first gear 51 comes into abutment against the tooth 52t of the second gear 52 at the timing at which the relative velocity V decreases to be zero. Therefore, collision energy generated between the first gear 51 and the second gear 52 at the time of re-abutment is reduced. As a result, the gear rattling noise generated in the counter gear mechanism 50 can be reduced. Further, because the reduction of the gear rattling noise can be realized by the control of the rotation speed of the motor 30, the size of the speed reduction mechanism 40 and the number of components are not increased.

Figure 9:
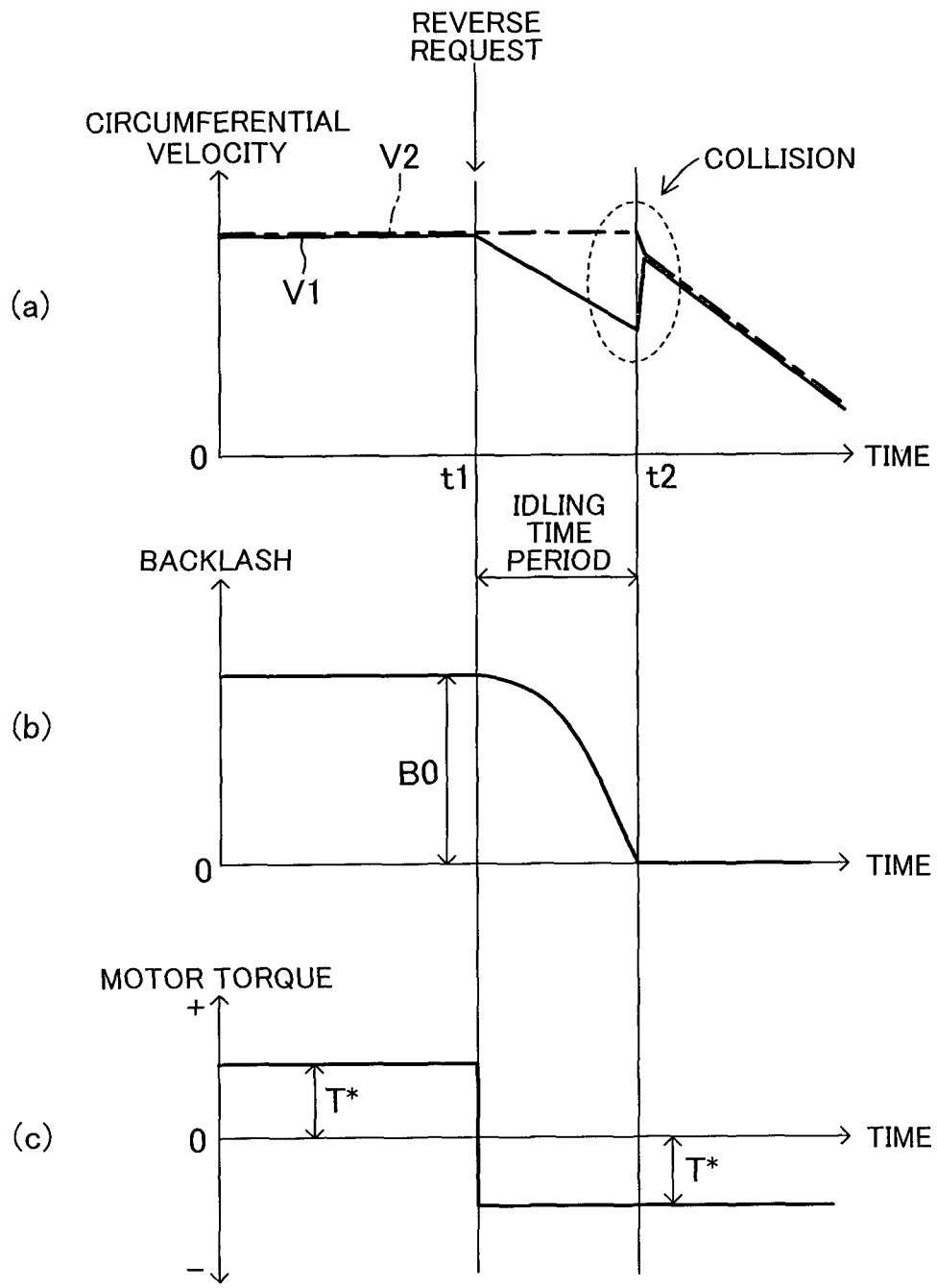
FIG. 9 is a graph showing a transition of the circumferential velocity, the backlash, and the motor torque when the motor torque planning is not performed.

As a comparative example, a case where the rotation speed of the motor 30 is not controlled in the idling time period is described. As shown in FIG. 9, at the time t1 at which the direction of the target torque T* is reversed, the control over the energization of the motor 30 is started so that the motor 30 generates the target torque T* (braking torque). Therefore, at the time t2 at which the first gear 51 and the second gear 52 come into abutment against each other again, the relative velocity V is increased. As a result, the tooth 51t of the first gear 51 and the tooth 52t of the second gear 52 strongly collide against each other. As a result, such large gear rattling noise that is audible to the driver is generated.

In this embodiment, for the control of the rotation speed of the motor 30 so that the relative velocity V at the time of re-abutment becomes zero, the reverse set torque Tn having a constant magnitude is generated in a first half of the idling time period, whereas the return set torque Tp having a constant magnitude is generated in a second half of the idling time period. Therefore, torque control (rotation-speed control) for the motor 30 is facilitated. Further, in the idling time period, the time period D1 in which the reverse set torque Tn is generated and the time period D2 in which the return set torque Tp is generated are sequentially set so that the integrated value (area A) of the predicted relative velocity V in the period from the current time to the time of re-abutment between the first gear 51 and the second gear 52 becomes equal to the backlash B at the current time based on the relative velocity Vnow at the current time. Therefore, even if the second gear circumferential velocity V2 changes during the idling time period of the first gear 51 under the influence of the disturbance, the change in the second gear circumferential velocity V2 is fed back to calculate the integrated value (area A) of the predicted relative velocity V with reference to the latest relative velocity Vnow after the occurrence of the disturbance. Therefore, the initially planned time periods D1 and D2 can be properly corrected. As a result, even if the disturbance occurs, the gear rattling noise can be reduced in an excellent manner.

Figure 8:
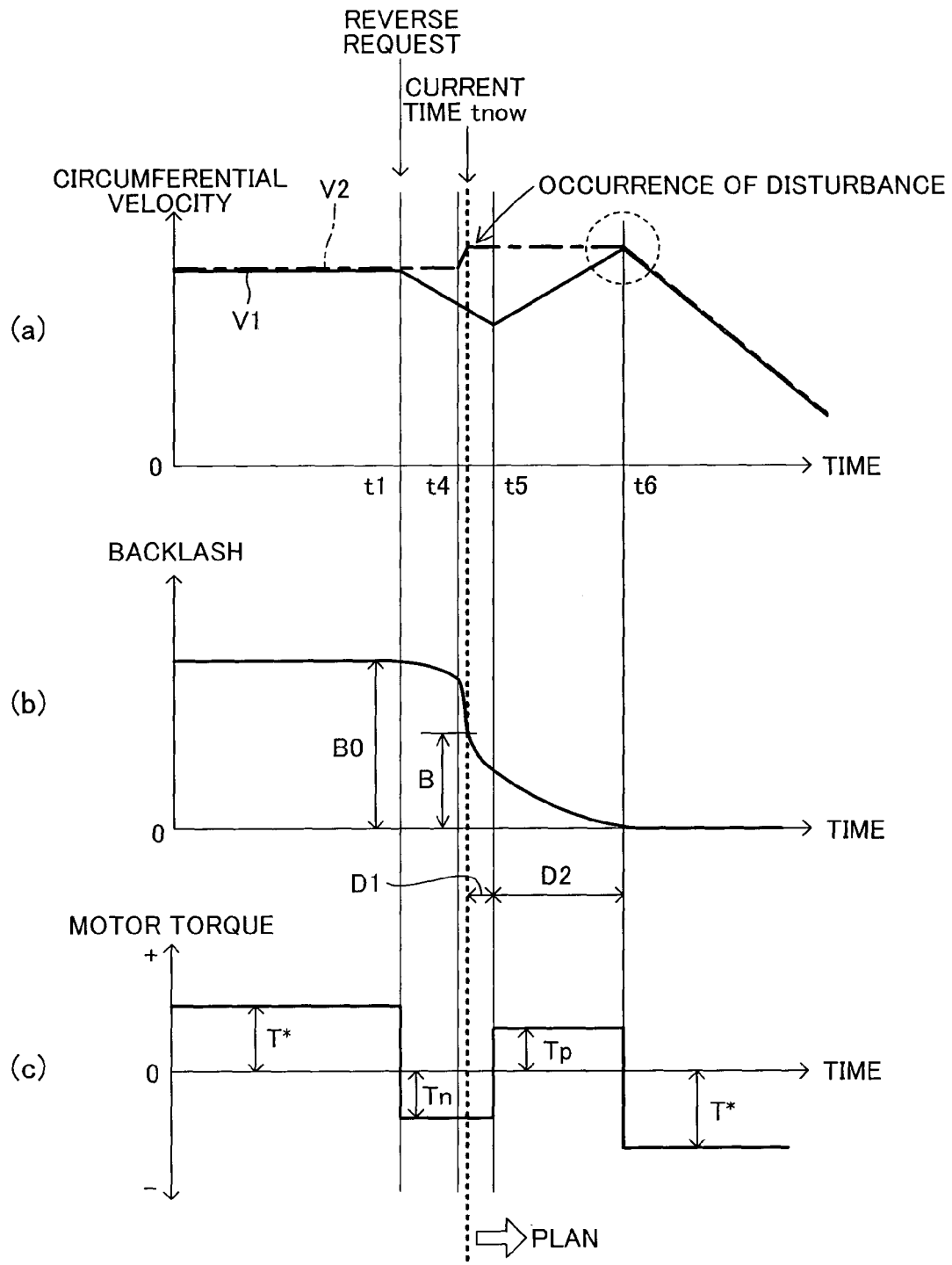
FIG. 8 is a graph showing the plan of the motor torque in a case where a disturbance occurs.

For example, when the second gear circumferential velocity V2 increases due to the disturbance (input from the road surface) at a time t4 as shown in FIG. 8, the time periods D1 and D2 are calculated with reference to the latest relative velocity Vnow after the occurrence of the disturbance at a time tnow at which the motor-torque plan is created immediately after the time t4. Therefore, the time period D1 in which the reverse set torque Tn is generated is updated and set so as to be shorter. Specifically, timing (time t5) at which the reverse set torque Tn is switched to the return set torque Tp is advanced as compared with the initially planned timing. As a result, the relative velocity V at the time of re-abutment (time t6) can be set to be zero. Depending on the timing at which the disturbance occurs or the magnitude of the disturbance, there are some cases where the relative velocity V at the time of re-abutment cannot be set to be zero. Nevertheless, the relative velocity V can be made closer to zero. Thus, the gear rattling noise generated in the counter gear mechanism 50 can be reduced.

Further, in this embodiment, the rotation angle sensor 81 is provided to the input shaft of the counter gear mechanism 50 (output shaft 33 of the motor 30), whereas the rotation angle sensor 82 is provided to the output shaft (rotary shaft 53). Therefore, by using the first rotation angle sensor 81, the rotation angle of the motor 30 without the influence of the backlash in the counter gear mechanism 50 can be detected with good accuracy. By using the second rotation angle sensor 82, the rotation angle of the wheel 10 without the influence of the backlash in the counter gear mechanism 50 can be detected with good accuracy. Therefore, the phase control for the motor 30 and the wheel speed detection can be performed with good accuracy.

Further, if a failure occurs in any one of the first rotation angle sensor 81 and the second rotation angle sensor 82, the gear rattling noise reduction control routine cannot be executed. However, the driving control for the motor 30 can be continued by using another of the rotation angle sensors in which a failure does not occur.

In the motor drive control device for controlling the driving of the motor 30 in accordance with the target torque T*, even when the direction of the target torque T* is reversed, the torque to be generated by the motor 30 is required to quickly follow the target torque T*. For this purpose, the first-direction abutment state is required to be quickly switched to the second-direction abutment state so as not generate the gear rattling noise as much as possible in the counter gear mechanism 50. In response to the request described above, the magnitude of the reverse set torque Tn and the magnitude of the return set torque Tp are set equal to each other in this embodiment. Therefore, the time period D1 and the time period D2 are set to approximately the same length during the idling time period. In addition, in both the time periods D1 and D2, a large torque can be generated within the range of capability of the motor 30. Therefore, by effectively using the capability of the motor 30, the reduction in gear rattling noise in the counter gear mechanism 50 and followability of the motor torque can be both achieved.

The motor drive control device according to this embodiment is described above, but the present invention is not limited to the above-mentioned embodiment. Various modifications may be made thereto without departing from the gist of the present invention.

For example, in this embodiment, the rotation speed of the motor 30 is controlled so that the re-abutment is achieved at the timing at which the relative velocity V (approach velocity) becomes zero. However, the timing at which the relative velocity V becomes zero is not necessarily required to be set as target timing for the re-abutment. The rotation speed of the motor 30 only needs to be controlled so that the re-abutment is achieved in a state in which the relative velocity V is lowered to a preset set velocity Vref (velocity at which the gear rattling noise can be reduced). For example, the timing of end of the time period D2 only needs to be set to timing at which it is detected that the relative velocity Vnow becomes equal to or lower than the set velocity Vref. In this case, the time period D2 may be set shorter than the time period D2 of this embodiment by Vref/α. Even in this modification, the gear rattling noise can be reduced without increasing the size of the speed reduction mechanism 40 and the number of components.

Further, in this embodiment, the motor torque plan (time periods D1 and D2) is set based on the backlash B and the relative velocity Vnow at the current time. However, the motor torque plan (time periods D1 and D2) may be simply set based only on the backlash B without using the relative velocity Vnow at the current time. For example, the motor ECU 80 may set a time period from the time at which the motor torque is reversed in response to the output of the reverse request to a time at which the backlash B becomes equal to a preset first set backlash Bref1 (for example, half the initial backlash B0) as the time period D1 in which the reverse set torque Tn is generated and may set a time period from the end of the time period D1 to a time at which the backlash B becomes equal to a preset second set backlash Bref2 as the time period D2 in which the return set torque Tp is generated. The second set backlash Bref2 only needs to be a backlash that is smaller than the first set backlash Bref1 and has a larger amount than zero and have the amount that allows the relative velocity V to be lowered during the idling time period to reduce the gear rattling noise. Even according to this modification, the gear rattling noise can be reduced without increasing the size of the speed reduction mechanism 40 and the number of components. Further, in this modification, the calculation of the relative velocity Vnow is no longer required. Thus, a calculation load of the motor ECU 80 can be reduced. In this case, similarly to the embodiment of the present invention, the magnitude of the reverse set torque Tn is preferably set equal to that of the return set torque Tp.

Alternatively, for example, the motor ECU 80 may set a time period from the time at which the motor torque is reversed to the time at which the backlash B becomes equal to or smaller than the preset first set backlash Bref1 (for example, half the initial backlash B0) as the time period D1 and may set a time period from the end of the time period D1 to a time at which the relative velocity Vnow becomes equal to or lower than the preset set velocity Vref (velocity at which the gear rattling noise can be reduced) as the time period D2.

Further, although the reverse set torque Tn and the return set torque Tp are respectively predetermined constant values in this embodiment, at least any one thereof may be variable. For example, in a case where the return set torque Tp is a constant value, the relative velocity V at the time of re-abutment cannot be set to be zero when the backlash B abruptly decreases (relative velocity V abruptly increases) due to the disturbance in the second half of the idling time period (B<B0/2). However, by increasing the magnitude (absolute value) of the return set torque Tp, the relative velocity V can be set to be zero or can be made closer to zero. This is because the gradient α of the relative velocity V can be increased by increasing the magnitude of the return set torque Tp.

For example, in a case where the predicted relative velocity V at the time of re-abutment does not become zero when the motor torque is planned in Step S15 of FIG. 3, the return set torque Tp only needs to be increased so that the predicted relative velocity V becomes closer to zero. In this case, associated data indicating the relationship between the magnitude of the return set torque Tp and the magnitude of the gradient α of the relative velocity V only needs to be stored in the motor ECU 80 so that the motor ECU 80 sets the magnitude of the return set torque Tp with which the predicted relative velocity V at the time of re-abutment becomes closest to zero.

Further, in this embodiment, the second rotation angle sensor 82 is provided so as to detect the rotation angle of the rotary shaft 53 of the counter gear mechanism 50. However, when the backlash in the planetary gear mechanism 60 is ignorably smaller than the backlash in the counter gear mechanism 50, for example, a second rotation angle sensor 82' (indicated by the broken line in FIG. 2) for detecting the rotation angle of the output shaft of the planetary gear mechanism 60, specifically, the rotation angle of the axle hub 110 may be used in place of the second rotation angle sensor 82 described above.

REFERENCE SIGNS LIST

1 . . . vehicle, 10 . . . wheel, 15 . . . suspension, 20 . . . motor unit, 30 . . . motor, 33 . . . output shaft, 40 . . . speed reduction mechanism, 50 . . . counter gear mechanism, 51 . . . first gear, 51t, 52t . . . tooth, 52 . . . second gear, 53 . . . rotary shaft, 60 . . . planetary gear mechanism, 80 . . . electronic control unit for motor control (motor ECU), 81 . . . first rotation angle sensor, 82 . . . second rotation angle sensor, 83 . . . operation state detection device, 84 . . . motion state detection device, 85 . . . motor driver, 86 . . . battery, A . . . area, B . . . backlash, B0 . . . initial backlash, D1 . . . first time period, D2 . . . second time period, T* . . . target torque, Tn . . . reverse set torque, Tp . . . return set torque, V1 . . . first gear circumferential velocity, V2 . . . second gear circumferential velocity, Θ1 . . . first rotation angle, Θ2 . . . second rotation angle

The invention claimed is:

1. A motor drive control device to be mounted in an in-wheel motor driven automobile comprising a motor and a speed reducer installed inside a wheel, the in-wheel motor driven automobile being configured to transmit a torque of the motor to the wheel through an intermediation of the speed reducer, the motor drive control device being configured to control driving of the motor in accordance with a target torque, the motor drive control device comprising an electronic control unit configured to:
detect a relative position between a tooth of an input-side gear and a tooth of an output-side gear included in the speed reducer; and
reduce a rotation speed of the motor when a direction of the target torque is reversed from a first direction to a second direction and for increasing the rotation speed of the motor at timing determined based on the relative position in a middle of an idling time period in which the input-side gear rotates in the second direction relative to the output-side gear due to a backlash present between the input-side gear and the output-side gear, to thereby lower an approach velocity at which the tooth of the input-side gear approaches the tooth of the output-side gear.

2. The motor drive control device according to claim 1, wherein the electronic control unit is further configured to:
control the rotation speed of the motor so that the tooth of the input-side gear comes into abutment against the tooth of the output-side gear in a state in which the approach velocity is lowered to a preset set velocity for reducing gear rattling noise.

3. The motor drive control device according to claim 1, wherein the electronic control unit is further configured to:
set, based on the relative position, a first time period starting at a time at which the direction of the target torque is reversed from the first direction to the second direction, in which a braking torque is generated by the motor, and a second time period starting at an end of the first time period, in which a driving torque in the first direction is generated by the motor; and
return control to normal control corresponding to a control mode in which the driving of the motor is controlled in accordance with the target torque, at end of the second time period.

4. The motor drive control device according to claim 3, wherein the electronic control unit is further configured to:
detect a relative velocity between the tooth of the input-side gear and the tooth of the output-side gear, and
set the first time period and the second time period based on the relative position and the relative velocity detected by the electronic control unit.

5. The motor drive control device according to claim 4, wherein the electronic control unit is further configured to:
set the first time period and the second time period so that a current backlash representing a relative movement amount of the tooth of the input-side gear relative to the tooth of the output-side gear, which is required for the tooth of the input-side gear to come into abutment against the tooth of the output-side gear and is obtained based on the relative position, and an integrated value obtained by integrating a predicted approach velocity at which the tooth of the input-side gear moves to approach the tooth of the output-side gear in a period from a current time to a time at which the tooth of the input-side gear comes into abutment against the tooth of the output-side gear by time become equal to each other.

6. The motor drive control device according to claim 3, wherein the braking torque and the driving torque in the first direction, which are to be generated by the motor during the idling time period, are set to have the same magnitude.

* * * * *